United States Patent
Zhang et al.

(10) Patent No.: US 10,816,985 B2
(45) Date of Patent: Oct. 27, 2020

(54) METHOD ON MOVING OBSTACLE REPRESENTATION FOR TRAJECTORY PLANNING

(71) Applicant: Baidu USA LLC, Sunnyvale, CA (US)

(72) Inventors: Liangliang Zhang, Sunnyvale, CA (US); Dong Li, Sunnyvale, CA (US); Jiangtao Hu, Sunnyvale, CA (US); Jiaming Tao, Sunnyvale, CA (US); Yifei Jiang, Sunnyvale, CA (US); Fan Zhu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 407 days.

(21) Appl. No.: 15/954,998

(22) Filed: Apr. 17, 2018

(65) Prior Publication Data

US 2019/0317509 A1 Oct. 17, 2019

(51) Int. Cl.
  *G05D 1/02* (2020.01)
  *G05D 1/00* (2006.01)
  *H04W 4/40* (2018.01)
  *B60W 10/20* (2006.01)
  *B60W 10/18* (2012.01)

(52) U.S. Cl.
  CPC ......... *G05D 1/0214* (2013.01); *G05D 1/0088* (2013.01); *G05D 1/0221* (2013.01); *B60W 10/18* (2013.01); *B60W 10/20* (2013.01); *B60W 2556/00* (2020.02); *B60W 2710/18* (2013.01); *B60W 2710/20* (2013.01); *G05D 1/027* (2013.01); *G05D 1/0246* (2013.01); *G05D 1/0257* (2013.01); *G05D 1/0278* (2013.01); *G05D 2201/0213* (2013.01); *H04W 4/40* (2018.02)

(58) Field of Classification Search
  None
  See application file for complete search history.

(56) References Cited

U.S. PATENT DOCUMENTS

| | | | |
|---|---|---|---|
| 2014/0012479 A1* | 1/2014 | Zhao | B60W 10/04 701/96 |
| 2015/0344030 A1* | 12/2015 | Damerow | B60W 30/0956 701/1 |
| 2015/0353082 A1* | 12/2015 | Lee | B60W 30/10 701/41 |
| 2017/0015313 A1* | 1/2017 | Mei | B60W 30/12 |
| 2017/0177937 A1* | 6/2017 | Harmsen | G05D 1/101 |

(Continued)

*Primary Examiner* — Jonathan M Dager
(74) *Attorney, Agent, or Firm* — Womble Bond Dickinson (US) LLP

(57) ABSTRACT

According to some embodiments, a system operates an ADV. In one embodiment, the system perceives a driving environment surrounding the ADV based on sensor data obtained from a plurality of sensors, including perceiving a moving obstacle that is moving relative to the ADV. The system projects the moving obstacle as a figure onto a station-time (ST) coordinate system, wherein the ST coordinate system indicates a distance between the figure and a reference point at different points in time. And the system, for each of a plurality of predetermined processing time intervals, determines two points of the figure in the ST coordinate system to represent a shape of the figure, wherein the shape of the figure is utilized to plan a trajectory to drive the ADV to avoid colliding with the moving obstacle.

21 Claims, 10 Drawing Sheets

(56) References Cited

U.S. PATENT DOCUMENTS

| | | | | |
|---|---|---|---|---|
| 2017/0242443 | A1* | 8/2017 | Schuh | G06K 9/00791 |
| 2018/0059231 | A1* | 3/2018 | Dewberry | G01S 13/003 |
| 2018/0129203 | A1* | 5/2018 | Tafti | G05D 1/0005 |
| 2018/0356819 | A1* | 12/2018 | Mahabadi | B60W 30/00 |
| 2019/0079523 | A1* | 3/2019 | Zhu | G08G 1/16 |
| 2019/0079528 | A1* | 3/2019 | Zhu | B60W 30/143 |
| 2019/0084579 | A1* | 3/2019 | Maura | G05D 1/0212 |
| 2019/0086932 | A1* | 3/2019 | Fan | G08G 1/16 |
| 2019/0100197 | A1* | 4/2019 | Saiki | B60W 50/14 |
| 2019/0111874 | A1* | 4/2019 | Harada | B60W 30/09 |
| 2019/0196485 | A1* | 6/2019 | Li | G08G 1/166 |
| 2019/0235516 | A1* | 8/2019 | Zhang | B60W 60/001 |
| 2019/0243370 | A1* | 8/2019 | Li | B60W 30/08 |
| 2019/0278276 | A1* | 9/2019 | Zhang | G05D 1/0214 |
| 2019/0278284 | A1* | 9/2019 | Zhang | G06F 9/545 |
| 2019/0291725 | A1* | 9/2019 | Yokoi | G06K 9/00805 |
| 2019/0315357 | A1* | 10/2019 | Zhang | G05D 1/0238 |
| 2019/0317217 | A1* | 10/2019 | Day | G01S 7/026 |
| 2019/0317512 | A1* | 10/2019 | Zhang | G05D 1/0088 |
| 2019/0317515 | A1* | 10/2019 | Zhang | B60W 30/0953 |
| 2019/0317520 | A1* | 10/2019 | Zhang | G05D 1/0274 |
| 2019/0391585 | A1* | 12/2019 | Zhang | B60W 30/09 |
| 2020/0031340 | A1* | 1/2020 | Tao | B60W 30/146 |
| 2020/0064483 | A1* | 2/2020 | Li | G01S 13/931 |
| 2020/0130683 | A1* | 4/2020 | Oguri | B60W 30/0956 |
| 2020/0193181 | A9* | 6/2020 | Steinberg | G01S 17/04 |

\* cited by examiner

METHOD ON MOVING OBSTACLE REPRESENTATION FOR TRAJECTORY PLANNING

TECHNICAL FIELD

Embodiments of the present disclosure relate generally to operating autonomous vehicles. More particularly, embodiments of the disclosure relate to ST boundaries for autonomous driving vehicles (ADVs).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Vehicles can navigate using reference lines. A reference line is a path that autonomous driving vehicles should drive along in an ideal condition when there are no surrounding obstacles. Station-time (ST) boundary can be used by an ADV to model surrounding obstacles.

For autonomous driving, a blocking obstacle's ST boundary can be a set of points (s, t) that reflects at time t, an obstacle will block the ADV's path at position s (e.g., blocking obstacles). These ST boundaries are mapped onto a ST Graph for the ADV to avoid hitting the ST boundaries. Moreover, obstacles that may influence a driver's behavior (e.g., neighboring vehicle's blind zone) but do not block an ADV's path may be modeled with non-blocking ST boundaries. Examples of these obstacles include a decision not to bypass a vehicle of an adjacent lane, a neighboring vehicle's blind zone, staying out of a keep clear zone, or a decision to yield to relatively large vehicles.

Trajectory planning is an important component in the Autonomous Driving technology. A moving obstacle may be modeled as a closed figure in the ST coordinate system (e.g., on an ST graph). Traditionally, a quadrilateral is used to represent the closed figure (in other words, four points on the boundary of the figure are used to represent the moving obstacle in the ST coordinate system) in the actual operation of the ADV, which frequently introduces inaccuracies due to inconsistencies between the actual shape of the figure associated with the obstacle on the ST graph and the quadrilateral representation of the figure. The inaccuracies can cause planning failure and/or other safety issues.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a system operates an ADV. In one embodiment, the system perceives a driving environment surrounding the ADV based on sensor data obtained from a plurality of sensors, including perceiving a moving obstacle that is moving relative to the ADV. The system projects the moving obstacle as a figure onto a station-time (ST) coordinate system, wherein the ST coordinate system indicates a distance between the figure and a reference point at different points in time. And the system, for each of a plurality of predetermined processing time intervals, determines two points of the figure in the ST coordinate system to represent a shape of the figure, wherein the shape of the figure is utilized to plan a trajectory to drive the ADV to avoid colliding with the moving obstacle.

Figure 1:
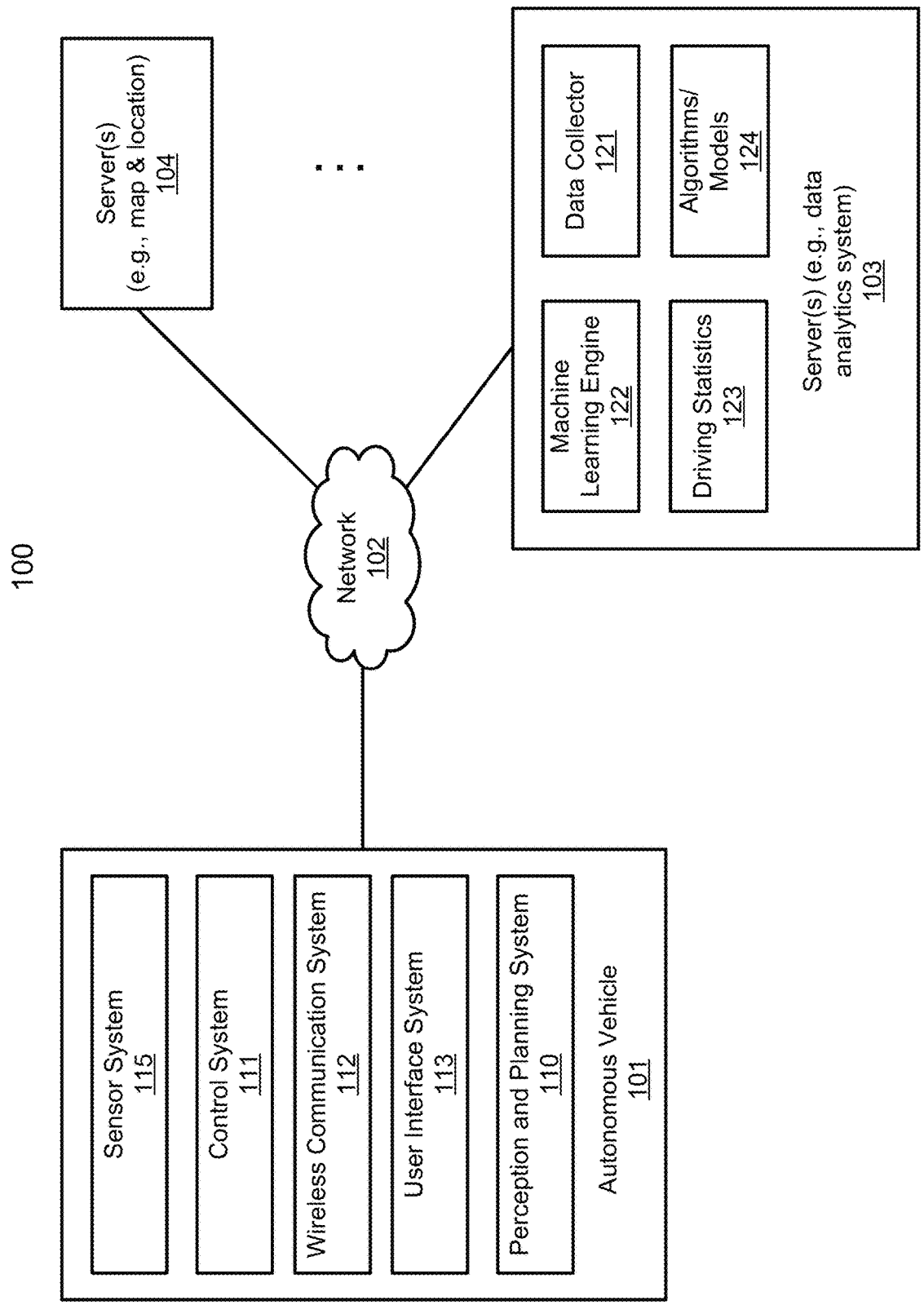
FIG. 1 is a block diagram illustrating a networked system according to one embodiment.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured into an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
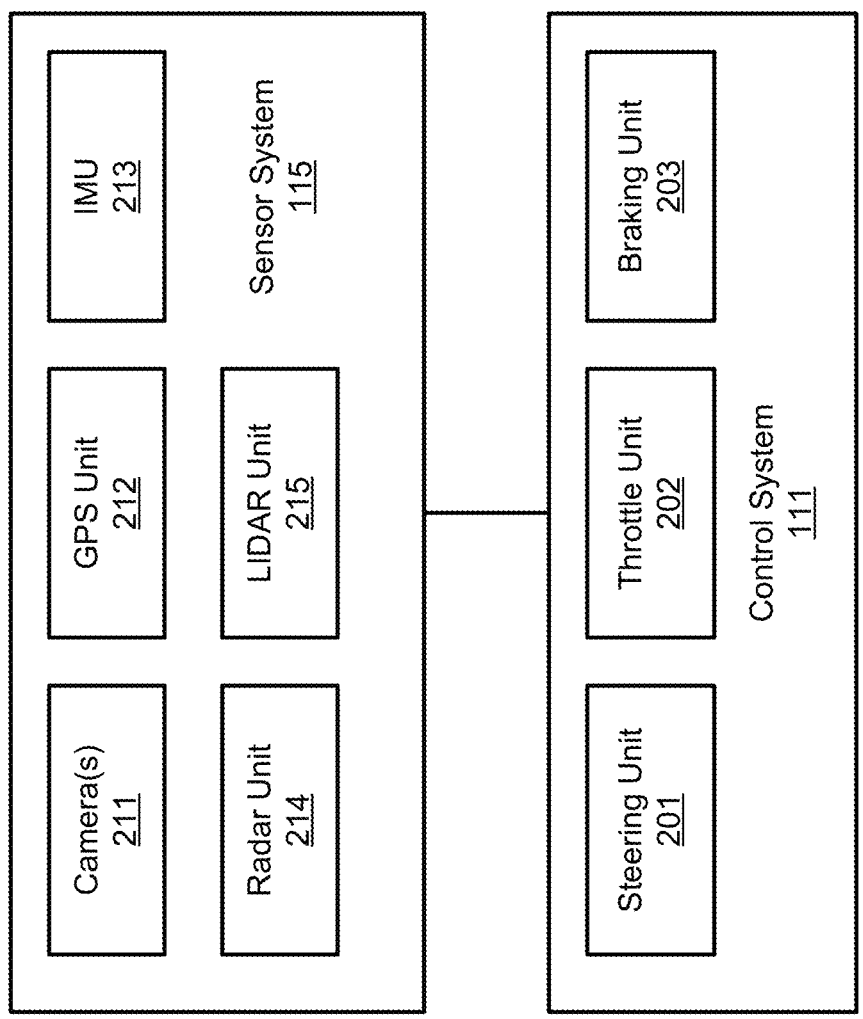
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using Wi-Fi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, for example, algorithms 124 may include an optimization method to optimize path planning and speed planning. The optimization method may include a set of cost functions and polynomial functions to represent path segments or time segments. These functions can be uploaded onto the autonomous driving vehicle to be used to generate a smooth path at real time.

Figure 3A:
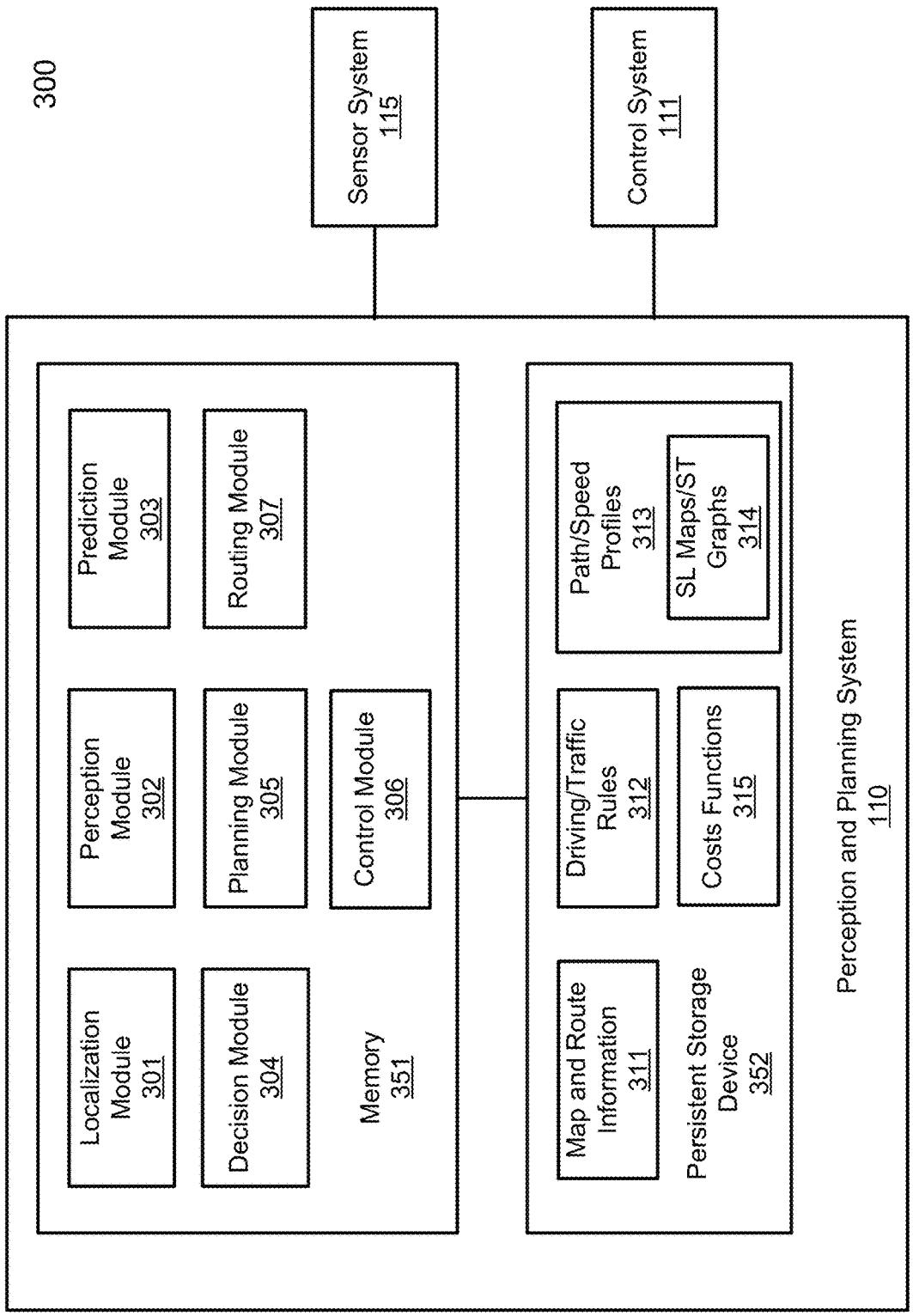
FIGS. 3A-3B are block diagrams illustrating examples of a perception and planning system used by an autonomous vehicle according to some embodiments.
Figure 3B:
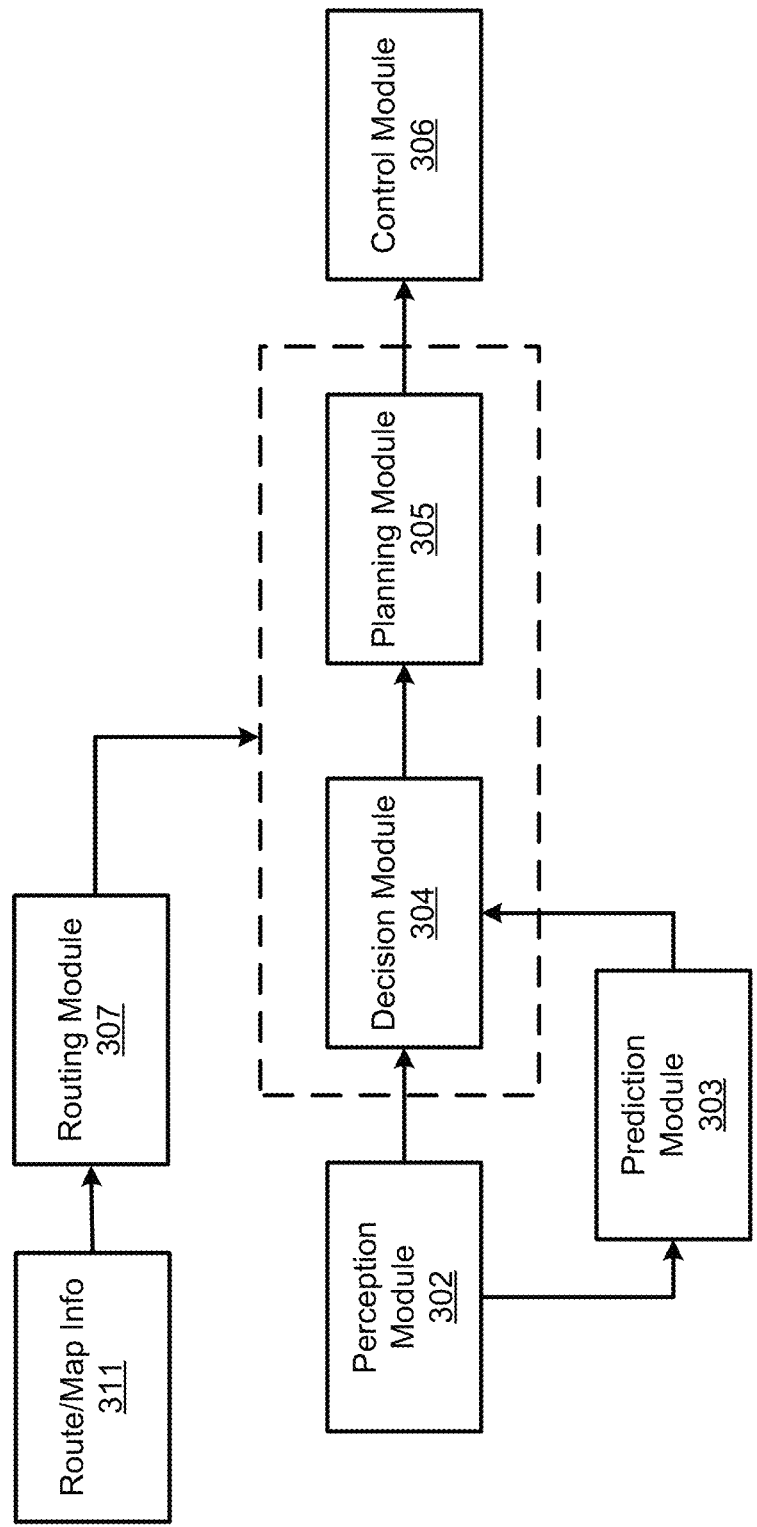

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, and routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module. For example, decision module 304 and planning module 305 may be integrated as a single module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Based on a decision for each of the objects perceived, planning module 305 plans a path or route for the autonomous vehicle, as well as driving parameters (e.g., distance, speed, and/or turning angle). That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 304/planning module 305 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

Routing module 307 can generate reference routes, for example, from map information such as information of road segments, vehicular lanes of road segments, and distances from lanes to curb. For example, a road can be divided into sections or segments {A, B, and C} to denote three road segments. Three lanes of road segment A can be enumerated {A1, A2, and A3}. A reference route is generated by generating reference points along the reference route. For example, for a vehicular lane, routing module 307 can connect midpoints of two opposing curbs or extremities of the vehicular lane provided by a map data. Based on the midpoints and machine learning data representing collected data points of vehicles previously driven on the vehicular lane at different points in time, routing module 307 can calculate the reference points by selecting a subset of the collected data points within a predetermined proximity of the vehicular lane and applying a smoothing function to the midpoints in view of the subset of collected data points.

Based on reference points or lane reference points, routing module 307 may generate a reference line by interpolating the reference points such that the generated reference line is used as a reference line for controlling ADVs on the vehicular lane. In some embodiments, a reference points table and a road segments table representing the reference lines are downloaded in real-time to ADVs such that the ADVs can generate reference lines based on the ADVs' geographical location and driving direction. For example, in one embodiment, an ADV can generate a reference line by requesting routing service for a path segment by a path segment identifier representing an upcoming road section ahead and/or based on the ADV's GPS location. Based on a path segment identifier, a routing service can return to the ADV reference points table containing reference points for all lanes of road segments of interest. ADV can look up reference points for a lane for a path segment to generate a reference line for controlling the ADV on the vehicular lane.

As described above, route or routing module 307 manages any data related to a trip or route of a user. The user of the ADV specifies a starting and a destination location to obtain trip related data. Trip related data includes route segments and a reference line or reference points of the route segment. For example, based on route map info 311, route module 307 generates a route or road segments table and a reference points table. The reference points are in relations to road segments and/or lanes in the road segments table. The reference points can be interpolated to form one or more reference lines to control the ADV. The reference points can be specific to road segments and/or specific lanes of road segments.

For example, a road segments table can be a name-value pair to include previous and next road lanes for road segments A-D. E.g., a road segments table may be: {(A1, B1), (B1, C1), (C1, D1)} for road segments A-D having lane 1. A reference points table may include reference points in x-y coordinates for road segments lanes, e.g., {(A1, (x1, y1)), (B1, (x2, y2)), (C1, (x3, y3)), (D1, (x4, y4))}, where A1 . . . D1 refers to lane 1 of road segments A-D, and (x1, y1) . . . (x4, y4) are corresponding real world coordinates. In one embodiment, road segments and/or lanes are divided into a predetermined length such as approximately 200 meters segments/lanes. In another embodiment, road segments and/or lanes are divided into variable length segments/lanes depending on road conditions such as road curvatures. In some embodiments, each road segment and/or lane can include several reference points. In some embodiments, reference points can be converted to other coordinate systems, e.g., latitude-longitude.

In some embodiments, reference points can be converted into a relative coordinates system, such as station-lateral (SL) coordinates. A station-lateral coordinate system is a coordinate system that references a fixed reference point to follow a reference line. For example, a (S, L)=(1, 0) coordinate can denote one meter ahead of a stationary point (i.e., the reference point) on the reference line with zero meter lateral offset. A (S, L)=(2, 1) reference point can denote two meters ahead of the stationary reference point along the reference line and an one meter lateral offset from the reference line, e.g., offset to the left by one meter.

In one embodiment, decision module 304 generates a rough path profile based on a reference line provided by routing module 307 and based on obstacles and/or traffic information perceived by the ADV, surrounding the ADV. The rough path profile can be a part of path/speed profiles 313 which may be stored in persistent storage device 352. The rough path profile is generated by selecting points along the reference line. For each of the points, decision module 304 moves the point to the left or right (e.g., candidate movements) of the reference line based on one or more obstacle decisions on how to encounter the object, while the rest of points remain steady. The candidate movements are performed iteratively using dynamic programming to path candidates in search of a path candidate with a lowest path cost using cost functions, as part of costs functions 315 of FIG. 3A, thereby generating a rough path profile. Examples of cost functions include costs based on: a curvature of a route path, a distance from the ADV to perceived obstacles, and a distance of the ADV to the reference line. In one embodiment, the generated rough path profile includes a station-lateral map, as part of SL maps/ST graphs 314 which may be stored in persistent storage devices 352.

In one embodiment, decision module 304 generates a rough speed profile (as part of path/speed profiles 313) based on the generated rough path profile. The rough speed profile indicates the best speed at a particular point in time controlling the ADV. Similar to the rough path profile, candidate speeds at different points in time are iterated using dynamic programming to find speed candidates (e.g., speed up or slow down) with a lowest speed cost based on cost functions, as part of costs functions 315 of FIG. 3A, in view of obstacles perceived by the ADV. The rough speed profile decides whether the ADV should overtake or avoid an obstacle, and to the left or right of the obstacle. In one embodiment, the rough speed profile includes a station-time (ST) graph (as part of SL maps/ST graphs 314). Station-time graph indicates a distance travelled with respect to time.

In one embodiment, the rough path profile is recalculated by optimizing a path cost function (as part of cost functions 315) using quadratic programming (QP). In one embodiment, the recalculated rough path profile includes a station-lateral map (as part of SL maps/ST graphs 314). In one embodiment, planning module 305 recalculates the rough speed profile using quadratic programming (QP) to optimize a speed cost function (as part of cost functions 315). In one embodiment, the recalculated rough speed profile includes a station-time graph (as part of SL maps/ST graphs 314).

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 4:
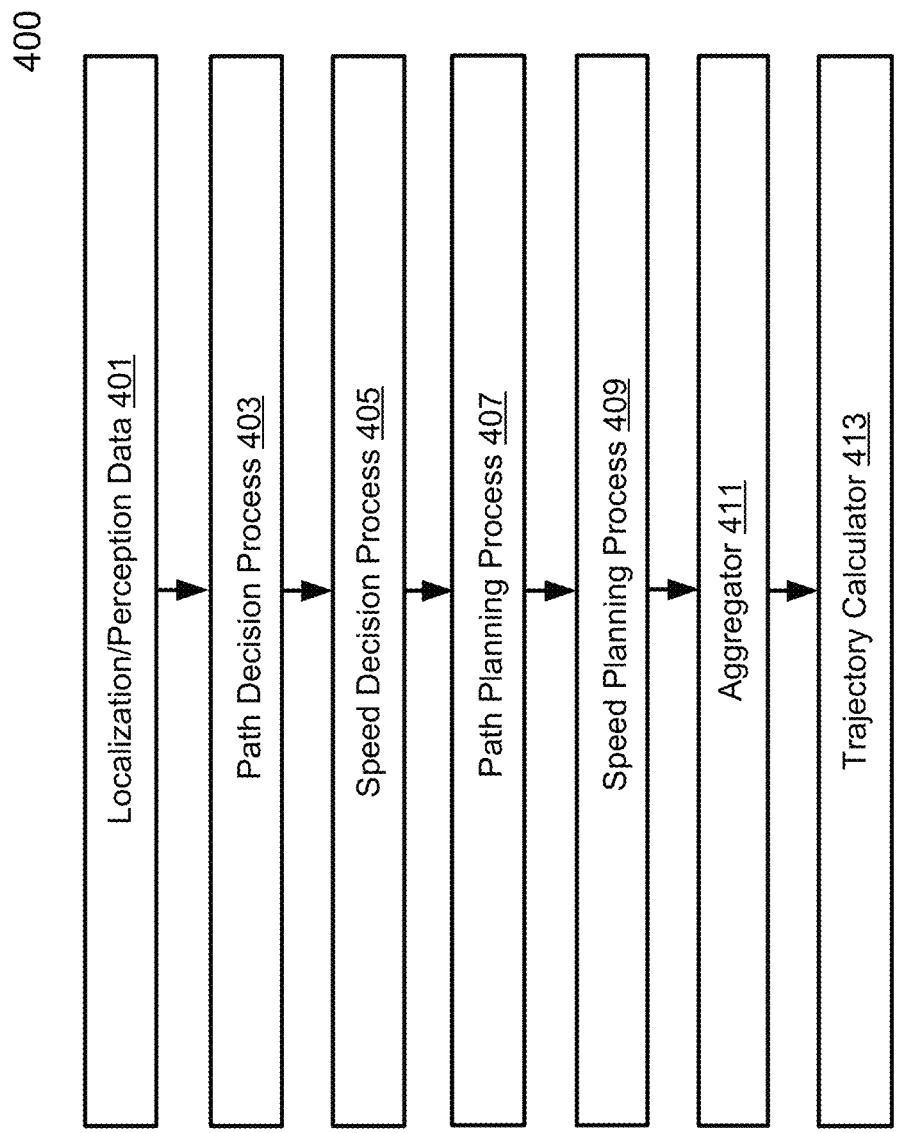
FIG. 4 is a block diagram illustrating an example of a decision and a planning processes according to one embodiment.
Figure 5:
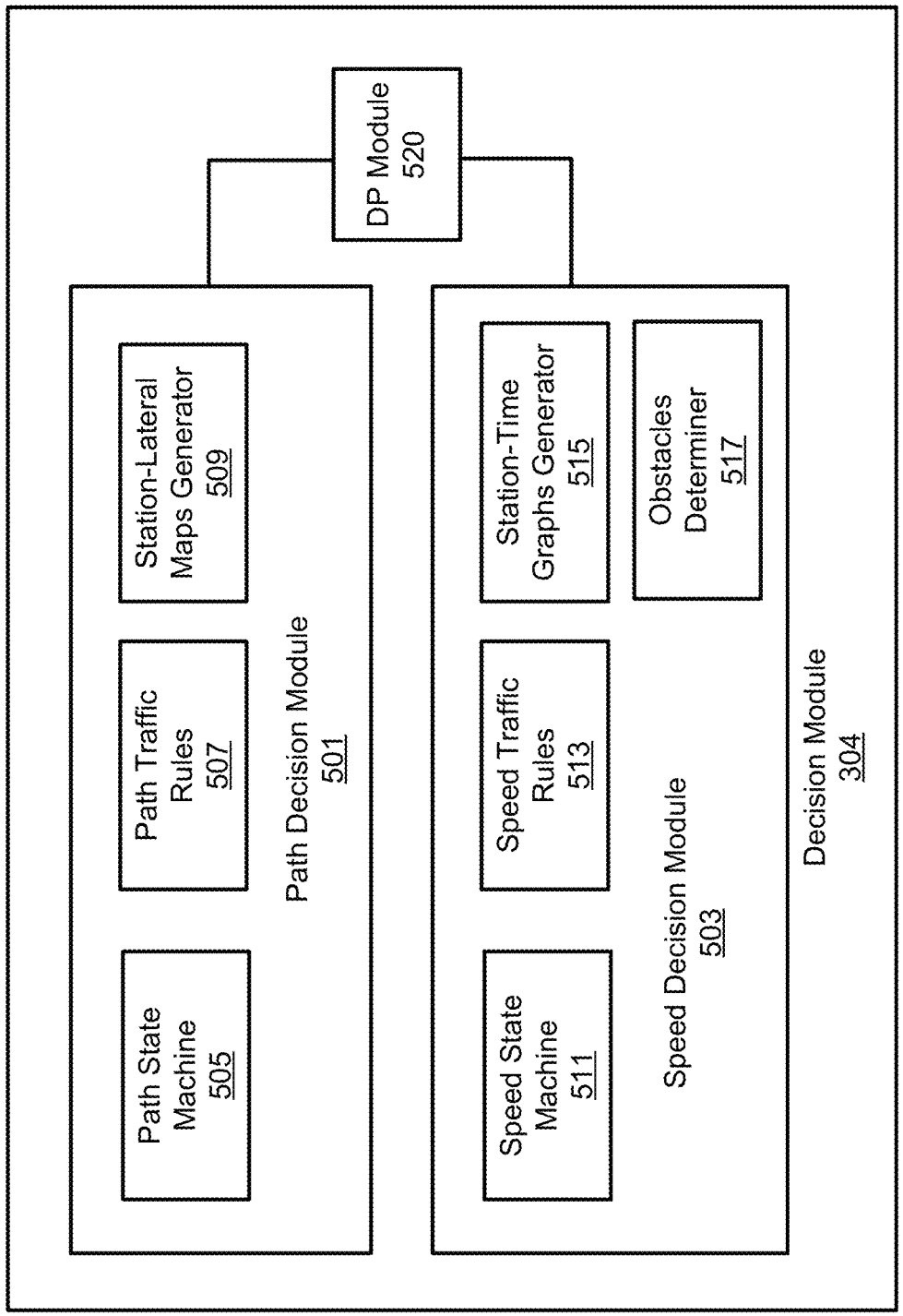
FIG. 5 is a block diagram illustrating an example of a decision module according to one embodiment.

FIG. 4 is a block diagram illustrating an example of a decision and planning process according to one embodiment. FIG. 5 is a block diagram illustrating an example of a decision module according to one embodiment. Referring to FIG. 4, Decision and planning process 400 includes localization/perception data 401, path decision process 403, speed decision process 405, path planning process 407, speed planning process 409, aggregator 411, and trajectory calculator 413.

Path decision process 403 and speed decision process 405 may be performed respectively by a path decision module 501 and a speed decision module 503 of decision module 304 in FIG. 5. Referring to FIGS. 4-5, path decision process 403 or path decision module 501 includes path state machine 505, path traffic rules 507, and station-lateral maps generator 509. In one embodiment, path decision process 403 or path decision module 501 can generate a rough path profile, using dynamic programming (via DP module 520), as an initial condition for speed decision process 405. For example, path state machine 505 can include at least three states: cruising, changing lane, and idle states. Path state machine 505 provides previous planning results and important information such as whether the ADV is cruising or changing lanes. Path traffic rules 507, as part of driving/traffic rules 312 of FIG. 3A, include traffic rules that can affect the outcome of a path decisions module. For example, path traffic rules 507 can include traffic information such as construction traffic signs such that the ADV can avoid road lanes under construction. From the path states, traffic rules, a reference line provided by routing module 307, and obstacles perceived by the sensor systems of the ADV, path decision process 403 can decide how the perceived obstacles are handled (i.e., ignore, yield, stop, or pass), as part of a rough path profile.

For example, in one embedment, the rough path profile is generated by a cost function consisting of costs based on: a curvature of path and a distance from the reference line and/or reference points to the perceived obstacles. Points on the reference line are selected and are moved to the left or right of the reference lines as candidate movements representing path candidates. Each of the candidate movements has an associated cost. The associated costs for candidate movements of one or more points on the reference line can be solved using dynamic programming for an optimal cost sequentially, one point at a time. In one embodiment, SL maps generator 509 generates a station-lateral (SL) map as part of the rough path profile. Here, the perceived obstacles can be modeled as SL boundaries of the SL map. A SL map is a two-dimensional geometric map (similar to an x-y coordinate plane) that includes obstacles information (or SL boundaries) perceived by the ADV. The generated SL map lays out an ADV path for controlling the ADV. Note, dynamic programming (or dynamic optimization) is a mathematical optimization method that breaks down a problem to be solved into a sequence of value functions, solving each of these value functions just once and storing their solutions. The next time the same value function occurs, the previous computed solution is simply looked up saving computation time instead of recomputing its solution.

As described above, obstacles perceived by the ADV for the path decision process 403 include obstacles as SL boundaries. Speed decision process 405, however, includes obstacles as ST boundaries (e.g., boundaries of a station-time (ST) graph). In one embodiment, ST boundaries include blocking and non-blocking boundaries. Note, blocking boundaries corresponds to obstacles that block a path of the ADV. Non-blocking boundaries correspond to obstacles that do not block a path of the ADV but can be modeled to influence a speed of the ADV.

Speed decision process 405 or speed decision module 503 includes speed state machine 511, speed traffic rules 513, station-time graphs generator 515, and obstacles determiner 517. Speed decision process 405 or speed decision module 503 can generate a rough speed profile using dynamic optimization or dynamic programming (via dynamic programming (DP) module 520) as an initial condition for path/speed planning processes 407 and 409. In one embodiment, speed state machine 511 includes at least two states: speed up and slow down states. Speed traffic rules 513, as part of driving/traffic rules 312 of FIG. 3A, include traffic rules that can affect the outcome of a speed decisions module. For example, speed traffic rules 513 can include traffic information such as red/green traffic lights, another vehicle in a crossing route, etc. From a state of the speed state machine, speed traffic rules and/or perceived obstacles, and rough path profile/SL map generated by decision process 403, speed decision process 405 can generate a rough speed profile to control a speed of the ADV in view of blocking and non-blocking obstacles. Non-blocking obstacles can be determined by obstacles determiner 517. ST graphs generator 515 can then generate a ST graph as part of the rough speed profile.

Referring to FIG. 4, path planning process 407 can use a rough path profile (e.g., a SL map from path decision process 403) as the initial condition to recalculate an optimal SL curve or S path using quadratic programming. Quadratic programming involves minimizing or maximizing an objective function (e.g., a quadratic function with several variables) subject to bounds, linear equality, and/or inequality constraints.

Speed planning process 409 can use a rough speed profile (e.g., a ST graph from speed decision process 405) as initial condition to recalculate an optimal ST curve using quadratic programming.

Aggregator 411 performs the function of aggregating the path and speed planning results. For example, in one embodiment, aggregator 411 can combine the ST graph and the SL map into a SLT graph. In another embodiment, aggregator 411 can interpolate (or fill in additional points) based on 2 consecutive points on a SL reference line or ST curve. In another embodiment, aggregator 411 can translate reference points from (S, L) coordinates to (x, y) coordinates. Trajectory generator 413 can calculate the final trajectory to control the ADV. For example, based on the SLT graph provided by aggregator 411, trajectory generator 413 calculates a list of (x, y, T) points indicating at what time should the ADV pass a particular (x, y) coordinate.

Thus, referring back to FIG. 4, path decision process 403 and speed decision process 405 are to generate a rough path profile and a rough speed profile taking into consideration obstacles (blocking and non-blocking) and/or traffic conditions. Given all the path and speed decisions regarding the obstacles, path planning process 407 and speed planning process 409 are to optimize the rough path profile and the speed profile in view of the obstacles using QP programming to generate an optimal trajectory with minimum path cost and/or speed cost.

Non-blocking obstacles may be determined by projecting predetermined regions outwardly from a left and a right side of the rough trajectory and calculating if obstacles perceived by the ADV will overlap these predetermined regions. Generating a speed profile may include performing a dynamic optimization on a speed of the ADV based on the path profile and in view of the non-blocking obstacles. Performing a dynamic optimization may include optimizing a cost function to generate a station-time graph for the speed profile.

Non-blocking obstacles may correspond to one or more of: 1) a decision not to bypass a neighboring vehicle, 2) a decision to keep clear from a blind zone region of a neighboring vehicle, or 3) a decision to keep clear from a particular road region.

Figure 6:
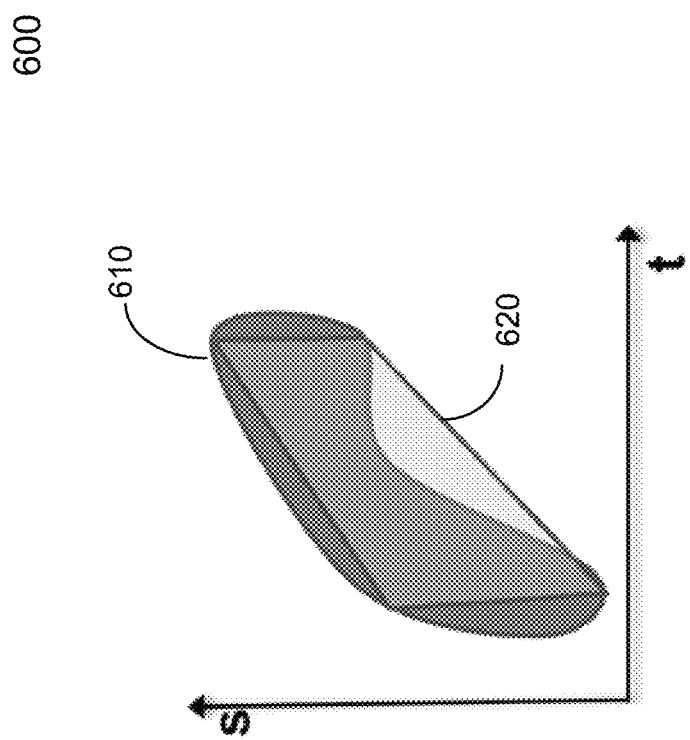
FIG. 6 is a diagram illustrating a conventional method for representing a moving obstacle that is modeled with a figure on the ST graph.

Referring to FIG. 6, a diagram 600 illustrating a conventional method for representing a moving obstacle that is modeled with a figure on the ST graph is shown. In the ST coordinate system, a quadrilateral 620 is used to represent the figure 610, which models a moving obstacle. In other words, four points on the boundary of the figure 610 are used to represent the obstacle with which the figure 610 is associated in the ST coordinate system when relevant operations of the ADV are performed. Inaccuracies due to inconsistencies between the actual shape of the figure 610 and the quadrilateral representation 620 of the figure 610 are introduced as a result. The inaccuracies may cause planning failure and/or other safety issues.

A naïve solution to the problem associated with the representation inaccuracy described above is to increase the number of points on the boundary of the figure 610 used in the operations. In other words, a polygon with more than four sides may be used to represent the obstacle to increase accuracy. However, increasing the number of points may significantly increase the processing time needed because the time complexity associated with increasing the number of points is $O(N)$, where N is the number of points.

Figure 7:
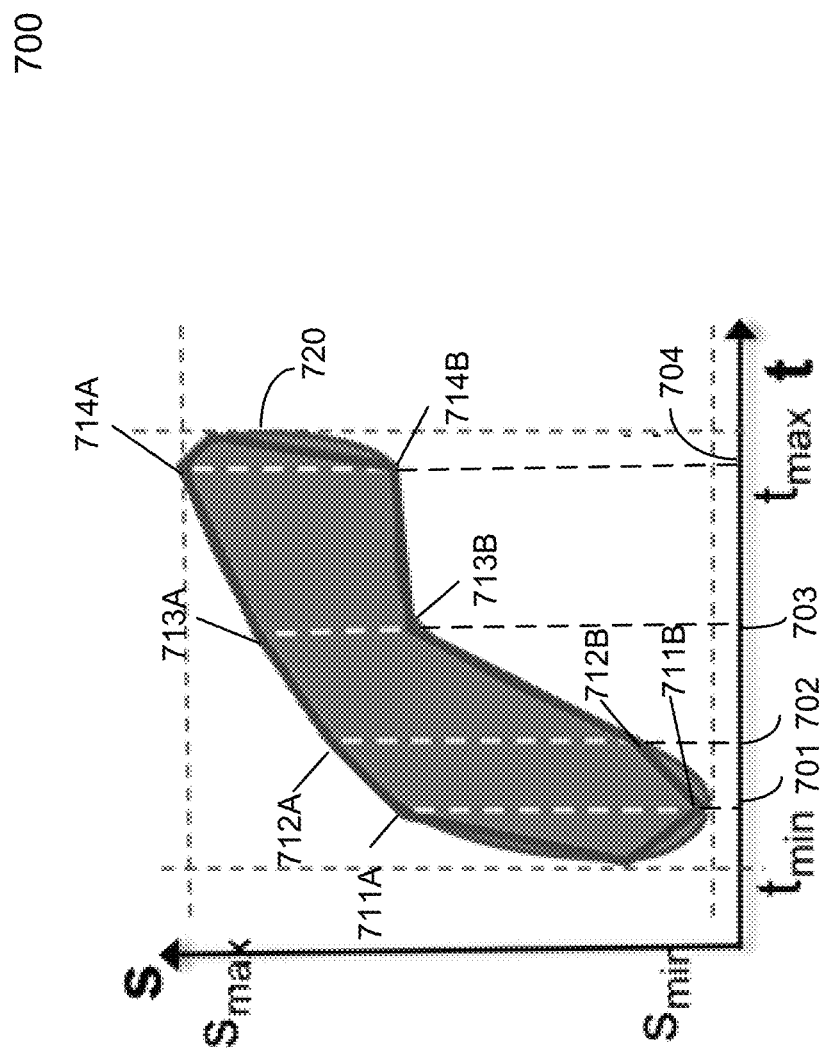
FIG. 7 is a diagram illustrating a method for representing a moving obstacle on the ST graph according to one embodiment of the disclosure.

Referring to FIG. 7, a diagram 700 illustrating a method for representing a moving obstacle on the ST graph according to one embodiment of the disclosure is shown. At each of a plurality of processing occasions, two points in the ST coordinate system, one upper and one lower, are determined to represent the moving obstacle. Thus, the two points are located on the boundary of the figure that models the obstacle in the ST coordinate system and correspond to the same time. The processing occasions may be spaced by a uniform time interval (e.g., 0.1, 0.2, or 0.3 seconds, etc.). In other words, after every processing time interval, the pair of points on the ST graph are determined. Adjacent pairs of points may be merged. For example, in FIG. 7, at a processing occasion 701, an upper point 711A and a lower point 711B are determined in the ST coordinate system to represent the moving obstacle. The pair of points 711A, 711B are located on the boundary of the figure 720 that models the obstacle. Similarly, at processing occasions 702-704, respective pairs of points (712A, 712B)-(714A, 714B) in the ST coordinate system are determined to represent the moving obstacle. The processing occasions 701-704 may be spaced by a uniform processing time interval (e.g., 0.1, 0.2, or 0.3 seconds, etc.). It should be appreciated that representing a moving obstacle in the ST coordinate system using the method illustrated in FIG. 7 is associated with a time complexity of $O(\lg N)$, where N is the number of points (upper and lower), which is a significant improvement over the O(N) time complexity. Thus, quick operations (search, find, evaluate, etc.) may be achieved.

Figure 8:
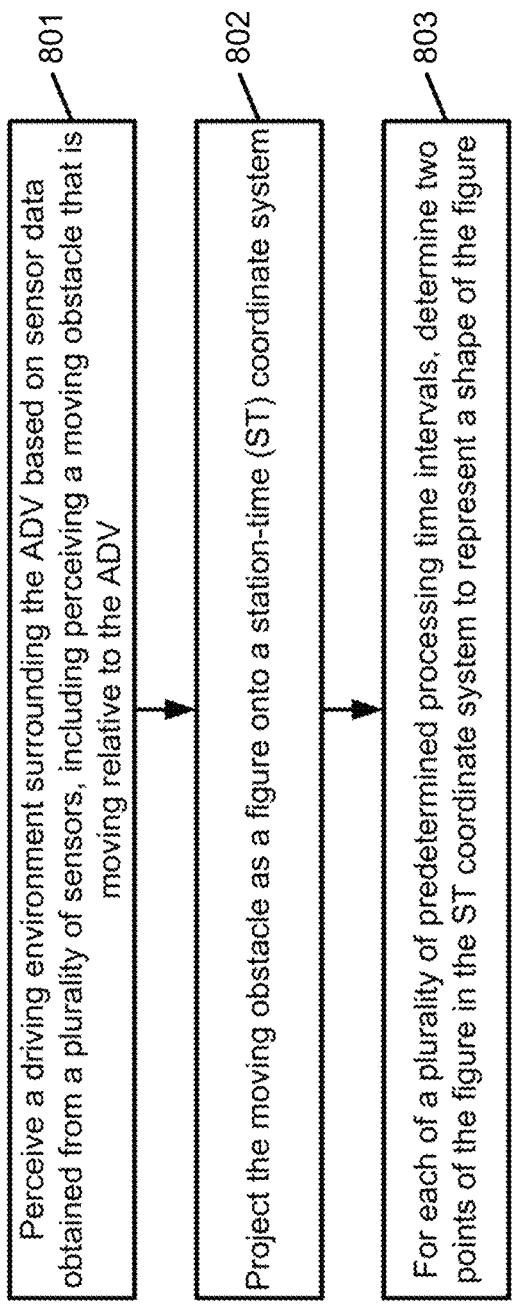
FIG. 8 is a flow diagram illustrating a method according to one embodiment.

FIG. 8 is a flow diagram illustrating a method for operating an ADV. Processing 800 may be performed by processing logic which may include software, hardware, or a combination thereof. For example, process 800 may be performed by speed decision module 503 of FIG. 5. Referring to FIG. 8, at block 801, a driving environment surrounding the ADV may be perceived based on sensor data obtained from a plurality of sensors, including perceiving a moving obstacle that is moving relative to the ADV. At block 802, the moving obstacle may be projected as a figure onto a station-time (ST) coordinate system, wherein the ST coordinate system indicates a distance between the figure and a reference point at different points in time. At block 803, for each of a plurality of predetermined processing time intervals, two points of the figure may be determined in the ST coordinate system to represent a shape of the figure, wherein the shape of the figure is utilized to plan a trajectory to drive the ADV to avoid colliding with the moving obstacle.

Further, the trajectory for the ADV may be planned based on the points of the figure representing the moving obstacle in the ST coordinate system, including performing a speed optimization of the trajectory. The two points determined at each processing time interval may comprise one upper point and one lower point that intercept a perimeter of the figure, wherein the upper point and the lower point correspond to an identical time. Adjacent pairs of points representing the moving obstacle in the ST coordinate system may be merged.

Figure 9:
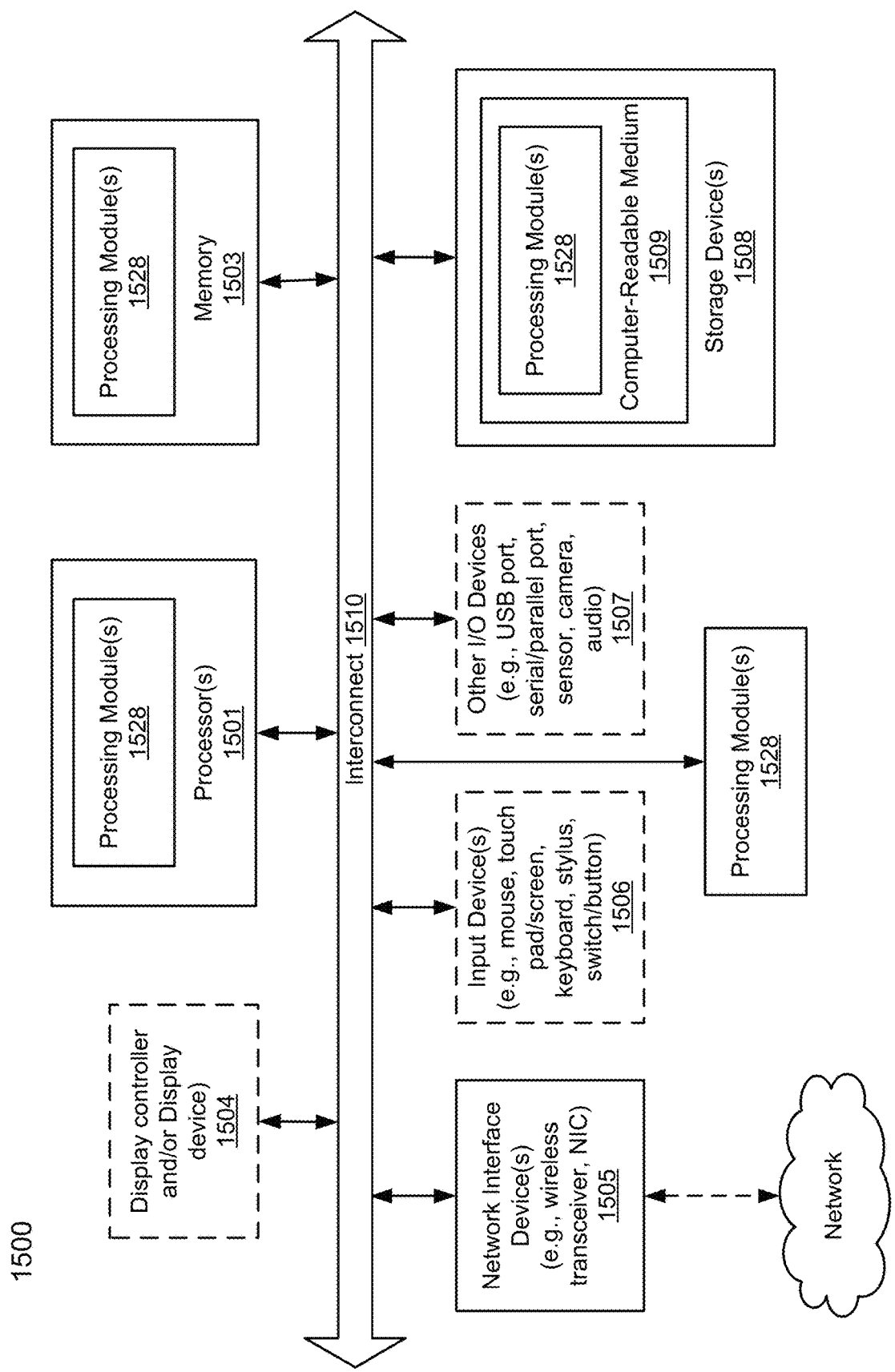
FIG. 9 is a block diagram illustrating a data processing system according to one embodiment.

FIG. 9 is a block diagram illustrating an example of a data processing system which may be used with one embodiment of the disclosure. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, path decision module 501, and speed decision module 503 of FIG. 5. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle (ADV), the method comprising:
perceiving a driving environment surrounding the ADV based on sensor data obtained from a plurality of sensors, including perceiving a moving obstacle that is moving relative to the ADV;
projecting the moving obstacle as a figure onto a station-time (ST) coordinate system, wherein the ST coordinate system indicates a distance between the figure and a reference point at different points in time; and
for each of a plurality of predetermined processing time intervals, determining two points of the figure in the ST coordinate system to represent a shape of the figure, wherein the shape of the figure is utilized to plan a trajectory to drive the ADV to avoid colliding with the moving obstacle.

2. The computer-implemented method of claim 1, further comprising planning the trajectory for the ADV based on the points of the figure representing the moving obstacle in the ST coordinate system, including performing a speed optimization of the trajectory.

3. The computer-implemented method of claim 1, wherein the two points determined at each processing time interval comprise one upper point and one lower point that intercept a perimeter of the figure.

4. The computer-implemented method of claim 3, wherein the upper point and the lower point correspond to an identical time.

5. The computer-implemented method of claim 1, wherein the processing time interval is a uniform time interval.

6. The computer-implemented method of claim 5, wherein the processing time interval is approximately 0.2 seconds.

7. The computer-implemented method of claim 1, further comprising merging adjacent pairs of points representing the moving obstacle in the ST coordinate system.

8. A non-transitory machine-readable medium having instructions stored therein, which when executed by a processor, cause the processor to perform operations for operating an autonomous driving vehicle (ADV), the operations comprising:
perceiving a driving environment surrounding the ADV based on sensor data obtained from a plurality of sensors, including perceiving a moving obstacle that is moving relative to the ADV;
projecting the moving obstacle as a figure onto a station-time (ST) coordinate system, wherein the ST coordinate system indicates a distance between the figure and a reference point at different points in time; and
for each of a plurality of predetermined processing time intervals, determining two points of the figure in the ST coordinate system to represent a shape of the figure, wherein the shape of the figure is utilized to plan a trajectory to drive the ADV to avoid colliding with the moving obstacle.

9. The non-transitory machine-readable medium of claim 8, further comprising planning the trajectory for the ADV based on the points of the figure representing the moving obstacle in the ST coordinate system, including performing a speed optimization of the trajectory.

10. The non-transitory machine-readable medium of claim 8, wherein the two points determined at each processing time interval comprise one upper point and one lower point that intercept a perimeter of the figure.

11. The non-transitory machine-readable medium of claim 10, wherein the upper point and the lower point correspond to an identical time.

12. The non-transitory machine-readable medium of claim 8, wherein the processing time interval is a uniform time interval.

13. The non-transitory machine-readable medium of claim 12, wherein the processing time interval is approximately 0.2 seconds.

14. The non-transitory machine-readable medium of claim 8, further comprising merging adjacent pairs of points representing the moving obstacle in the ST coordinate system.

15. A data processing system, comprising:
a processor; and
a memory coupled to the processor to store instructions, which when executed by the processor, cause the processor to perform operations for operating an autonomous driving vehicle (ADV), the operations including
perceiving a driving environment surrounding the ADV based on sensor data obtained from a plurality of sensors, including perceiving a moving obstacle that is moving relative to the ADV;
projecting the moving obstacle as a figure onto a station-time (ST) coordinate system, wherein the ST coordinate system indicates a distance between the figure and a reference point at different points in time; and
for each of a plurality of predetermined processing time intervals, determining two points of the figure in the ST coordinate system to represent a shape of the figure, wherein the shape of the figure is utilized to plan a trajectory to drive the ADV to avoid colliding with the moving obstacle.

16. The data processing system of claim 15, the operations further comprising planning the trajectory for the ADV based on the points of the figure representing the moving obstacle in the ST coordinate system, including performing a speed optimization of the trajectory.

17. The data processing system of claim 15, wherein the two points determined at each processing time interval comprise one upper point and one lower point that intercept a perimeter of the figure.

18. The data processing system of claim 17, wherein the upper point and the lower point correspond to an identical time.

19. The data processing system of claim 15, wherein the processing time interval is a uniform time interval.

20. The data processing system of claim 19, wherein the processing time interval is approximately 0.2 seconds.

21. The data processing system of claim 15, the operations further comprising merging adjacent pairs of points representing the moving obstacle in the ST coordinate system.

\* \* \* \* \*